(12) United States Patent
Ishii et al.

(10) Patent No.: US 6,756,933 B2
(45) Date of Patent: Jun. 29, 2004

(54) RADAR SYSTEM AND CHARACTERISTIC ADJUSTMENT METHOD THEREOF

(75) Inventors: Toru Ishii, Hirakata (JP); Motoi Nakanishi, Nagaokakyo (JP); Tetsu Nishimura, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

(21) Appl. No.: 10/300,583

(22) Filed: Nov. 21, 2002

(65) Prior Publication Data

US 2003/0102998 A1 Jun. 5, 2003

(30) Foreign Application Priority Data

Nov. 30, 2001 (JP) ........................................ 2001-367415

(51) Int. Cl.[7] ................................................ G01S 7/40
(52) U.S. Cl. .................. 342/70; 342/172; 342/192; 342/109; 342/111; 342/84; 342/129
(58) Field of Search ........................ 342/70, 109, 111, 342/128, 135, 129, 174, 192, 84

(56) References Cited

U.S. PATENT DOCUMENTS

| | | | | |
|---|---|---|---|---|
| 5,563,602 A | * | 10/1996 | Stove | 342/70 |
| 5,619,208 A | * | 4/1997 | Tamatsu et al. | 342/70 |
| 5,719,580 A | | 2/1998 | Core | 342/100 |
| 5,751,240 A | * | 5/1998 | Fujita et al. | 342/70 |
| 5,757,307 A | * | 5/1998 | Nakatani et al. | 342/70 |
| 6,018,309 A | * | 1/2000 | Mitsumoto et al. | 342/109 |
| 6,198,426 B1 | * | 3/2001 | Tamatsu et al. | 342/70 |
| 2003/0102998 A1 | * | 6/2003 | Ishii et al. | 342/70 |
| 2003/0151543 A1 | * | 8/2003 | Nakanishi et al. | 342/70 |
| 2003/0156055 A1 | * | 8/2003 | Tamatsu et al. | 342/70 |

FOREIGN PATENT DOCUMENTS

| | | |
|---|---|---|
| JP | 08-304532 | 11/1996 |
| JP | 11-271428 | 10/1998 |

OTHER PUBLICATIONS

"Nonlinearity compensation circuit for voltage-controlled oscillator operating in linear frequency sweep mode", Kang, B.K.; Kwo H.J.; Mheen, B.K. Yoo, H.J.; Kim, Y.H.; Microwave and Guided Wave Letters, IEEE, vol: 10 Issue: 12, Dec. 2000, Ps: 537–539.*
Abstract of JP 11271428.
Abstract of JP 09/145826.

* cited by examiner

Primary Examiner—John B. Sotomayor
(74) Attorney, Agent, or Firm—Dickstein, Shapiro, Morin & Oshinsky, LLP.

(57) ABSTRACT

A radar system and a characteristic adjustment method for the radar system are provided, in which a control voltage waveform of a voltage controlled oscillator for frequency-modulating a sending signal can be set in a short time without increasing the required amount of memory. In adjusting time-varying characteristics of a voltage signal for frequency modulation on a voltage controlled oscillator determining a sending frequency, the time-varying characteristics of the voltage signal for frequency modulation are adjusted to optimize a form of a protrusion in signal intensity included in a frequency spectrum of a beat signal.

14 Claims, 11 Drawing Sheets

RADAR SYSTEM AND CHARACTERISTIC ADJUSTMENT METHOD THEREOF

BACKGROUND OF THE INVENTION

1. Field of the Invention

The present invention relates to a radar system for detecting a target with radio waves.

2. Description of the Related Art

An FM-CW (frequency-modulation continuous wave) radar system has been developed as an in-vehicle radar system for detecting other vehicles, human beings, and obstacles.

The FM-CW radar system sends a frequency-modulated continuous wave signal as a sending signal, and mixes the sending signal with a receiver signal that is the sending signal reflected from a target to produce a beat signal for detecting a relative position and relative speed of the target from the frequency of the beat signal.

In a circuit generating the above-mentioned sending signal, a voltage controlled oscillator (referred to as a VCO below) is used. The relationship between a control voltage and an oscillatory frequency of the VCO is known in advance, so that the desired frequency modulation can be performed by controlling the control voltage of the VOC.

However, oscillatory frequency characteristics of the VCO to the control voltage is not necessarily the same with respect to each VCO. That is, the characteristics exhibit variations.

Japanese Unexamined Patent Application Publication No. 8-304532 discloses correction of triangular waves in that the period of triangular wave control voltage to a VCO is divided into (n) to correct the triangular waves by sequentially selecting two of the divided intervals. Japanese Unexamined Patent Application Publication No. 11-271428 discloses that correction data is obtained by comparing the frequency spectrum for each (n)-divided interval.

However, in any one of radar systems in the Publications mentioned above, the modulation period is divided into (n), so that if the number of divisions is increased in order to improve the correction accuracy, preparing correction data requires a long time. Also, there is a problem that the capacity of memory for storing the correction data is increased.

SUMMARY OF THE INVENTION

It is an object of the present invention to provide a radar system capable of setting a control voltage waveform of a voltage controlled oscillator for frequency-modulating a sending signal in a short time without increasing the required capacity of memory, and a characteristic adjustment method for the radar system.

A radar system according to the present invention comprises a voltage controlled oscillator for determining a sending frequency, a transmitter for sending a sending signal. The sending signal includes an ascending modulation interval, wherein a frequency gradually increases, and a descending modulation interval, wherein the frequency gradually decreases, which are alternately repeated with time in a triangular waveform by applying a voltage signal for frequency modulation to the voltage controlled oscillator. The radar system further includes a receiver for receiving a receiver signal including a reflected signal from a target, a frequency analyzer for obtaining data relating to a frequency spectrum of a beat signal that has a frequency difference between the sending signal frequency and the receiver signal frequency, whereby the radar system detects a relative distance or a relative speed of the target on the basis of the beat signal in the ascending modulation interval and the beat signal in the descending modulation interval. The radar system also includes an adjuster for adjusting time-varying characteristics of the voltage signal for frequency modulation, and a data output device for outputting the data relating to the frequency spectrum.

By this configuration, the data relating to the frequency spectrum of the beat signal is read and the time-varying characteristics of the voltage signal for frequency modulation can be adjusted based on the data relating to the frequency spectrum.

Also, according to the present invention, the frequency analyzer may obtain a peak value of a protrusion of signal intensity included in the frequency spectrum as the data relating to the frequency spectrum. Thereby, the time-varying characteristics of the voltage signal for frequency modulation can be adjusted so as to optimize the peak value of the protrusion of signal intensity generated in the frequency spectrum by the reflection signal from a target.

Also, according to the present invention, the frequency analyzer may detect a protrusion of signal intensity including in the frequency spectrum and obtain acuteness of the protrusion as the data relating to the frequency spectrum. Thereby, the time-varying characteristics of the voltage signal for frequency modulation can be adjusted so as to optimize the acuteness of the power protrusion generated in the frequency spectrum by the reflection signal from a target.

Also, according to the present invention, the frequency analyzer may obtain a plurality of differences of protrusions of signal intensity including in the frequency spectrum, each of the differences being a difference between heights of a peak and a bottom adjacent to the peak of the protrusions, as the data relating to the frequency spectrum. Thereby, the time-varying characteristics of the voltage signal for frequency modulation can be adjusted so as to optimize the resolution of a plurality of signal intensities generated in the frequency spectrum by the reflection signals from a plurality of targets located at different distances.

Also, according to the present invention, the time-varying characteristics of the voltage signal for frequency modulation may be expressed by a multinomial expression, which is at least quadric, and the time-varying characteristics of the voltage signal for frequency modulation may be configured to be adjustable by changing factors of each term. Thereby, the time-varying characteristics of the voltage signal for frequency modulation can be expressed by small number of parameters and the required memory capacity does not increase, thus enabling the entire system to be miniaturized with low cost.

Also, according to the present invention, the data relating to the frequency spectrum output from the radar system is read and the time-varying characteristics of the voltage signal for frequency modulation are adjusted so as to optimize the data. Thereby, the time-varying characteristics of the voltage signal for frequency modulation for each radar system can be optimized, and the time-varying characteristics of the voltage signal for frequency modulation for each radar system can be extremely easily adjusted.

According to the present invention, a radar system includes the adjuster means for adjusting time-varying characteristics of the voltage signal for frequency modulation and data output device for outputting the data relating to the frequency spectrum of the beat signal outside, so that the data relating to the frequency spectrum of the beat signal is read outside and time-varying characteristics of the voltage signal for frequency modulation can be adjusted based on the data relating to the frequency spectrum. Moreover, as the correction is not performed by diving the modulation period into (n) as the prior art, creation of correction data does not require a long time and memory capacity for storing the correction data does not increase. Furthermore, as a spectrum analyzer is not necessary, characteristic adjustment can be easily performed.

DESCRIPTION OF THE PREFERRED EMBODIMENTS

A radar system and a characteristic adjustment method therefor according to an embodiment of the present invention will be described below with reference to the drawings.

Figure 1:
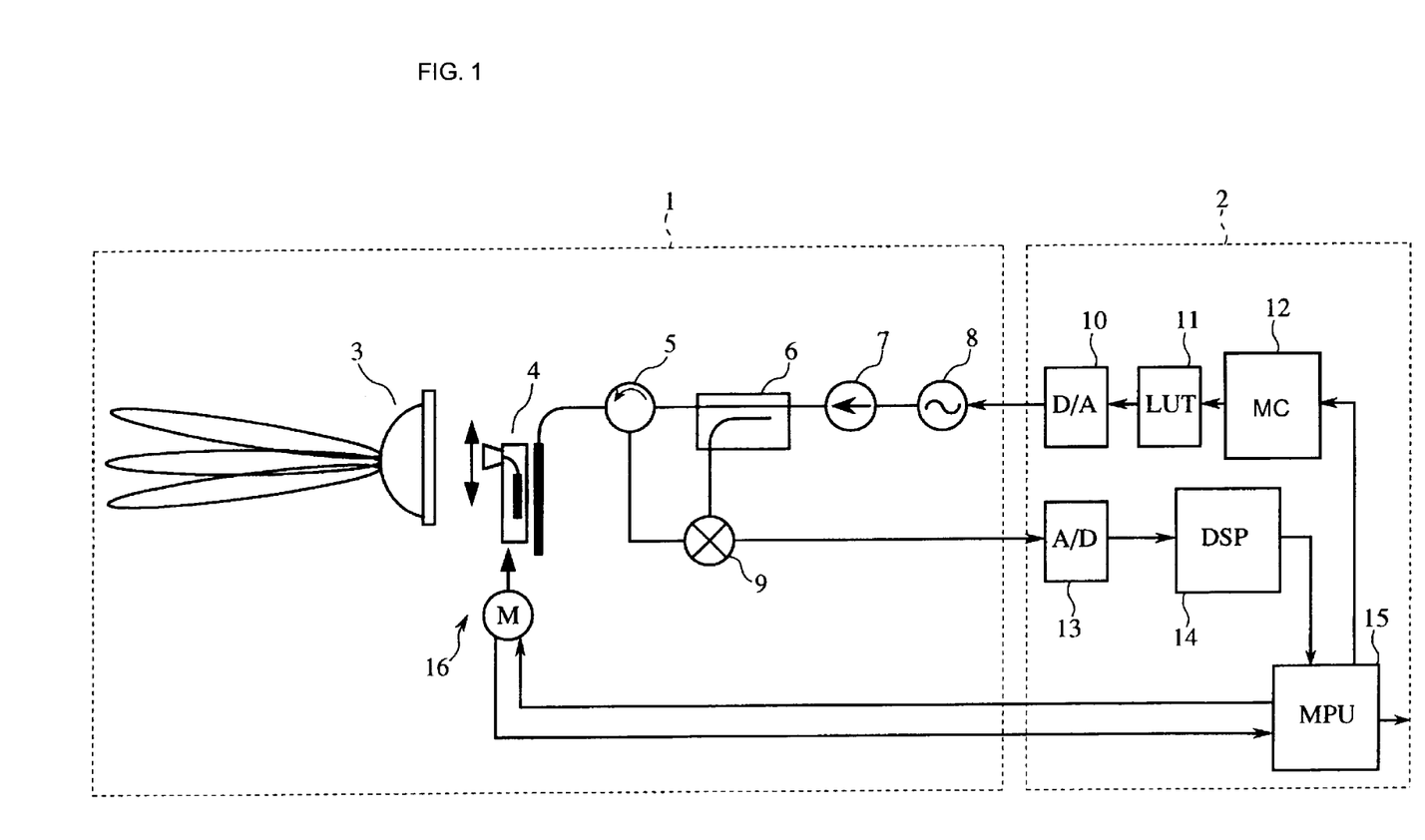
FIG. 1 is a block diagram showing a configuration of a radar system.

FIG. 1 is a block diagram showing a configuration of the radar system. Referring to FIG. 1, a RF block 1 sends and receives radio waves for radar measurement so as to output beat signals of sending and receiver signals to a signal processing block 2. A modulation counter 12 of the signal processing block 2 is a counter controlled by a microprocessor 15 and is for converting a counted value into a triangular waveform. The output value of the modulation counter 12 enters a look-up table 11 that outputs the output value with reference to a table. A DA converter 10 converts the output value from the look-up table 11 into an analog signal so as to feed it to a VCO 8 of the RF block 1. As a result, the VCO 8 frequency-modulates the oscillatory frequency into a triangular waveform.

An oscillatory signal from the VCO 8 is supplied to a primary radiator 4 via an isolator 7, a coupler 6, and a circulator 5. The primary radiator 4 is located on a focal plane of a dielectric lens 3 or in the vicinity of the focal plane, and the dielectric lens 3 sends a millimeter-wave signal radiated from the primary radiator 4 as an intense beam. After a reflected wave from a target, such as a vehicle, enters the primary radiator 4 via the dielectric lens 3, a receiver signal is led to a mixer 9 via the circulator 5. The mixer 9 receives the receiver signal and a local signal, which is a part of the sending signal from the coupler 6, so as to output a beat signal, which has the frequency difference between them, to an A/D converter 13 of the signal processing block 2 as an intermediate frequency signal. The A/D converter 13 converts the signal into digital data. A DSP (digital signal processor) 14 performs FFT (fast Fourier transformation) on a data row input from the A/D converter 13 so as to obtain the frequency spectrum of the beat signal.

The microprocessor 15 shown in FIG. 1 is provided with an interface circuit to be connected to a characteristic adjustment device and an interface for host device.

The microprocessor 15, when connected to the characteristic adjustment device, outputs data relating to the frequency spectrum of the beat signal to the characteristic adjustment device, and it also receives data for adjusting time-varying characteristics of a voltage signal for frequency-modulation from the characteristic adjustment device so as to control a counting speed of the modulation counter 12 based on the data.

The microprocessor 15, when connected to a host device, calculates a relative position and relative speed of a target and outputs this information to the host device.

A scanning unit 16 in the RF block 1 moves the primary radiator 4 in parallel with the focal plane of the dielectric lens 3, or with a plane parallel with the focal plane. A movable unit and fixed unit, in which the primary radiator 4 is provided, constitutes a 0-dB coupler. A driving motor M is for driving the coupler.

Figure 2:
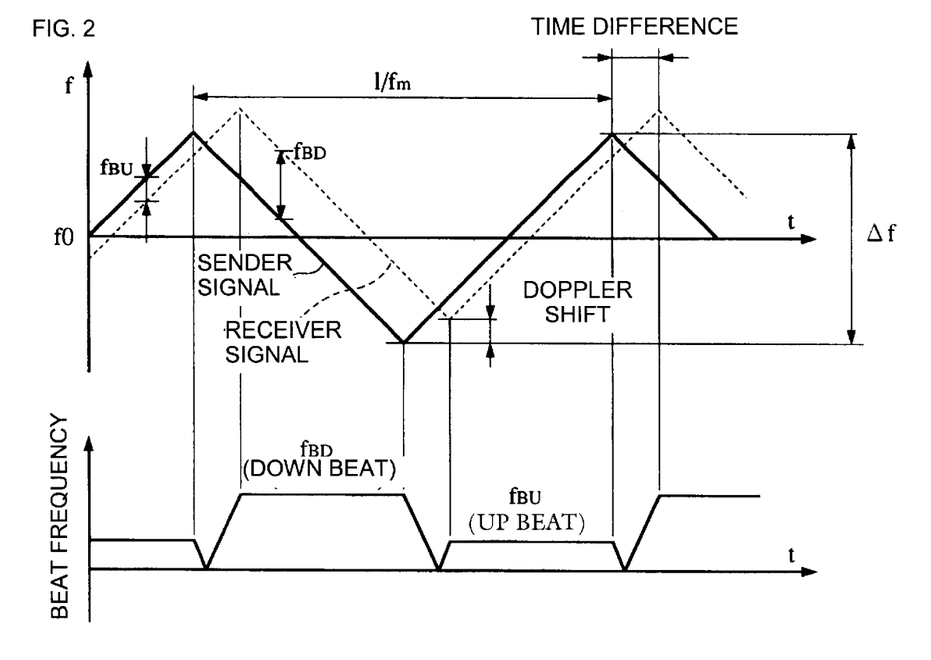
FIG. 2 is a drawing showing an example of frequency changes of sending and receiver signals changed by a relative distance and relative speed of a target.

FIG. 2 shows an example of deviations in frequency changes of sending and receiver signals due to the distance to the target and the relative speed of the target. The frequency difference between the sending and receiver signals in an ascending modulation interval of the sending signal is an upbeat frequency fBu, and the frequency difference between the sending and receiver signals in a descending modulation interval of the sending signal is a downbeat frequency fBD. A deviation of triangular waves on a temporal axis (time difference) between the sending and receiver signals corresponds to a reciprocating time of a radio wave between an antenna and the target. Also, a deviation on a frequency axis between the sending and receiver signals is a Doppler shift amount produced by the speed of the target relative to the antenna. The values of the upbeat frequency fBu and the downbeat frequency fBD are changed depending on the time difference and the Doppler shift amount. That is, by detecting upbeat and downbeat frequencies, the distance between the radar system and the target, and the target speed relative to the radar system are calculated.

Figure 3:
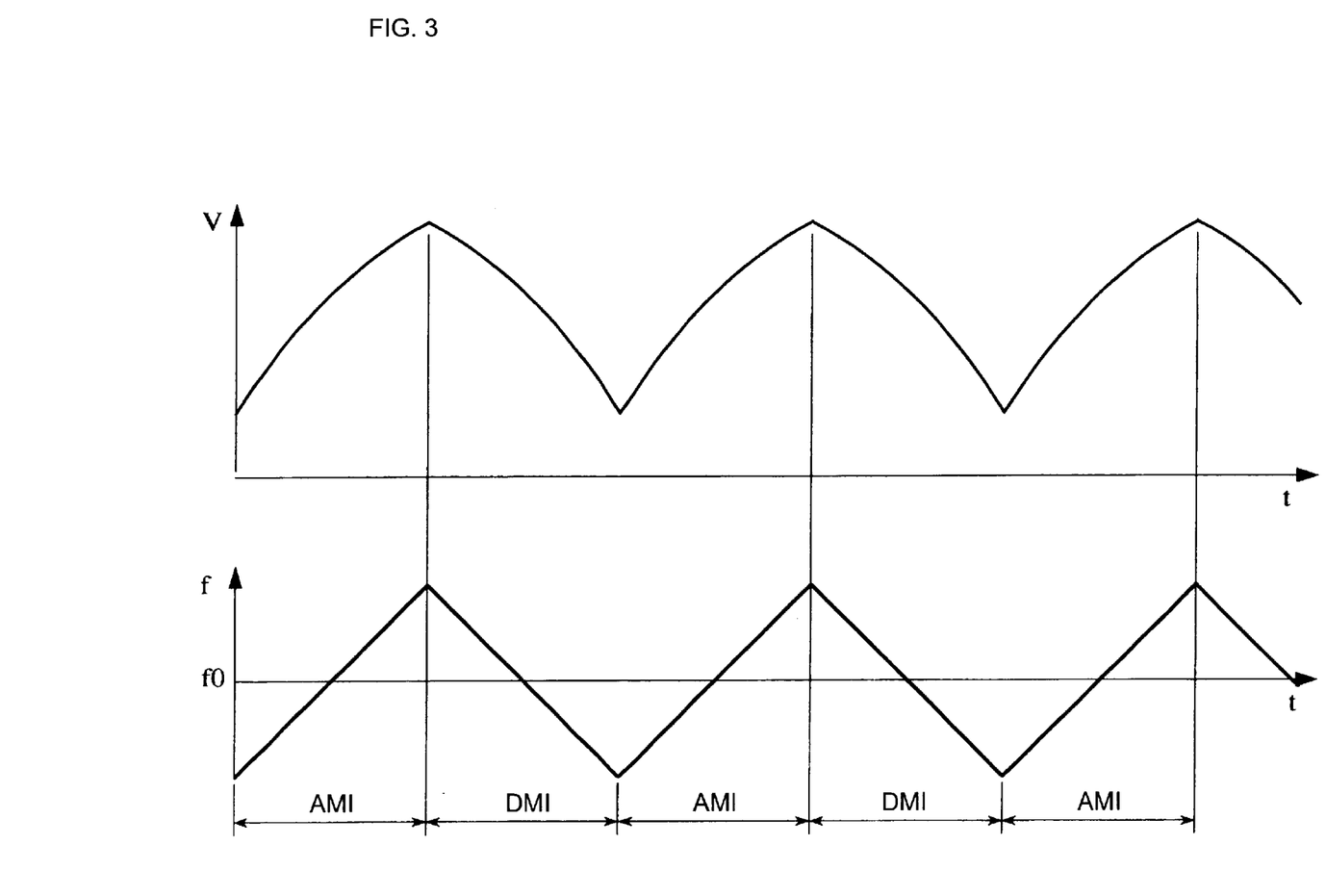
FIG. 3 includes drawings showing the relationship between time-varying characteristics of a voltage signal for frequency modulation and a frequency-modulated sending signal.

FIG. 3 shows the relationship between the time-varying characteristics of a voltage signal for frequency-modulation of the VCO 8 and the time-varying characteristics of the sending frequency. The horizontal axes are plotted with time, the vertical axis V is plotted with the voltage signal for frequency-modulation to the VCO 8, and the vertical axis f is plotted with the oscillatory frequency of the VCO 8. In the FM-CW radar system, the oscillatory signal of the VOC is preferably frequency-modulated in a triangular waveform. However, the voltage signal for frequency-modulation for the VCO and the oscillatory frequency typically cannot be exactly represented by a linear expression. Accordingly, the time variation of the voltage signal for frequency-modulation is not precisely a triangular wave, as shown in FIG. 3.

Figure 4:
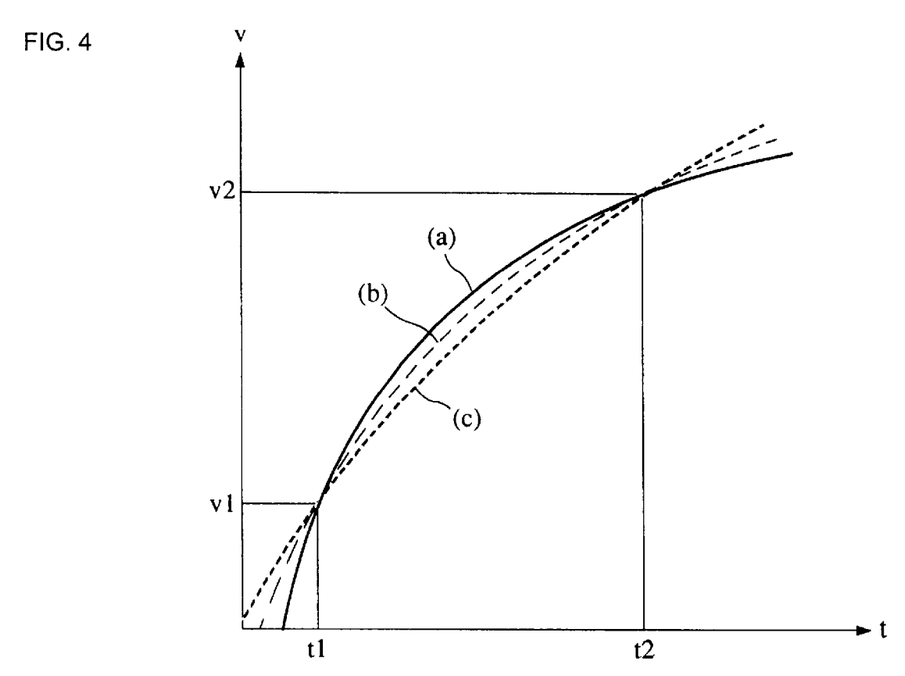
FIG. 4 is a drawing showing an example of time-varying characteristics of a voltage signal for frequency modulation.

FIG. 4 shows time-varying characteristics of the voltage signal for frequency-modulation in the ascending modulation interval (AMI) shown in FIG. 3. When the voltage for frequency-modulation is V; time is t; and voltages at t1 and t2 are v1 and v2, respectively, the voltage signal for frequency-modulation is expressed in the following formula.

$$V = \alpha(t-t1)(t-t2) + bt + c \quad (1)$$

wherein, the formula (V=bt+c) represents a straight line passing through points (t1, v1) and (t2, v2). The letters p and c are constant numbers.

Therefore, by changing a, the bulge of a curve passing through the two points (t1, v1) and (t2, v2) is changed. According to the embodiment, the time-varying characteristics of the voltage signal for frequency-modulation are set by establishing the above-mentioned parameter $\alpha$.

Figure 5A:
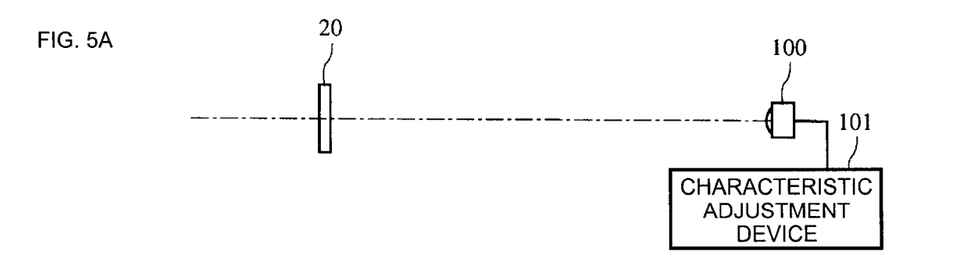
FIGS. 5A and 5B are drawings showing a state of characteristics adjustment.
Figure 5B:
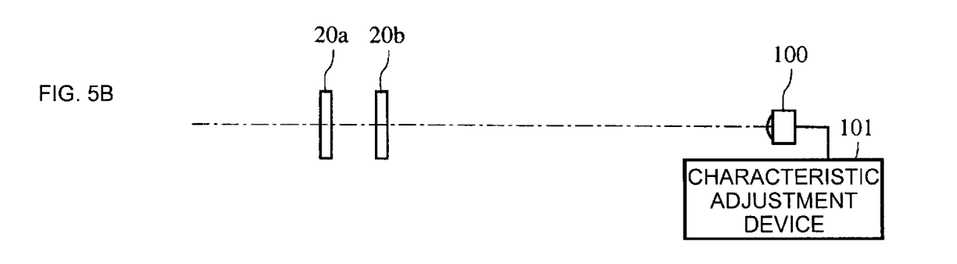

FIGS. 5A and 5B are drawings showing characteristic adjustment states of the radar system. In an example shown in FIG. 5A, a target 20 for characteristic adjustment is located at a position separated by a predetermined distance from a radar system 100 in front of the radar. To the radar system 100, a characteristic adjustment device 101 is connected.

Also, in an example shown in FIG. 5B, characteristic adjustment targets 20a and 20b are arranged at two points separated by different distances from the radar system 100 in front of the radar.

Next, three characteristic adjustment methods will be described.

Figure 6A:
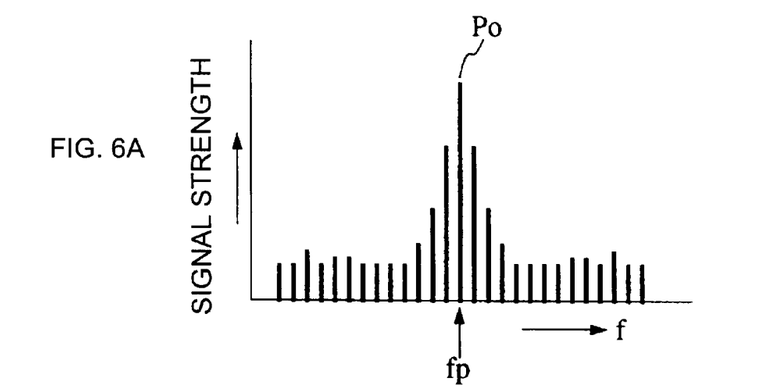
FIGS. 6A to 6C are drawings showing a frequency spectrum in a first characteristic adjustment method.
Figure 6B:
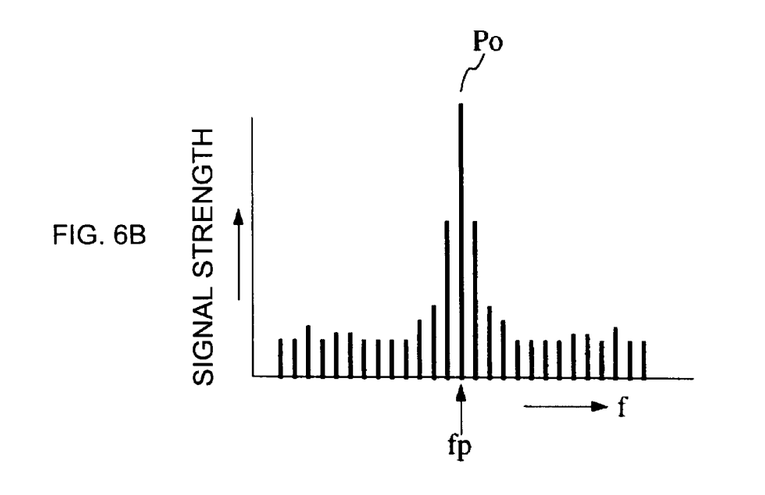
Figure 6C:
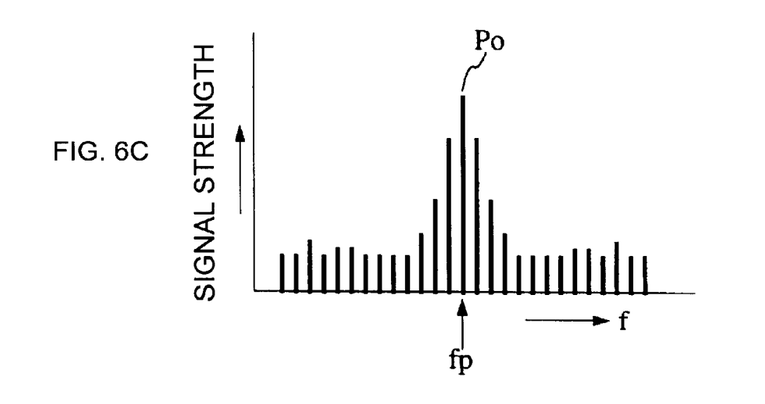

Frequency spectrums shown in FIGS. 6A to 6C are in the state that the single target 20 for characteristic adjustment is located at a predetermined position, as shown in FIG. 5A, and time-varying characteristics of the voltage signal for frequency-modulation differ from each other. FIGS. 6A to 6C correspond to symbols (a), (b), and (c) of FIG. 4, respectively.

In FIGS. 6A to 6C, the horizontal axis is plotted with the frequency of the beat signal and the vertical axis is plotted with the signal intensity (power). In these examples, in FFT range bins, a protrusion of the signal intensity is exhibited around a frequency position indicated by the frequency fp as the center. The protrusion is caused by the reflected wave from the target 20. If the time-varying characteristics of the voltage signal for frequency-modulation are expressed by the curve shown by (b) in FIG. 4, the signal intensity Po of the peak frequency fp has a maximum. The larger linearity-error of frequency changes of the sending signals in the ascending modulation interval and descending modulation interval shown in FIG. 3, the more the protrusion of the signal intensity looses its shape in the frequency spectrum of the beat signal. In other words, it is considered that the better the linearity, the more the signal intensity of the peak frequency increases. Therefore, the parameter a is to be set so that the signal intensity Po of the peak frequency fp has a maximum.

Figure 7:
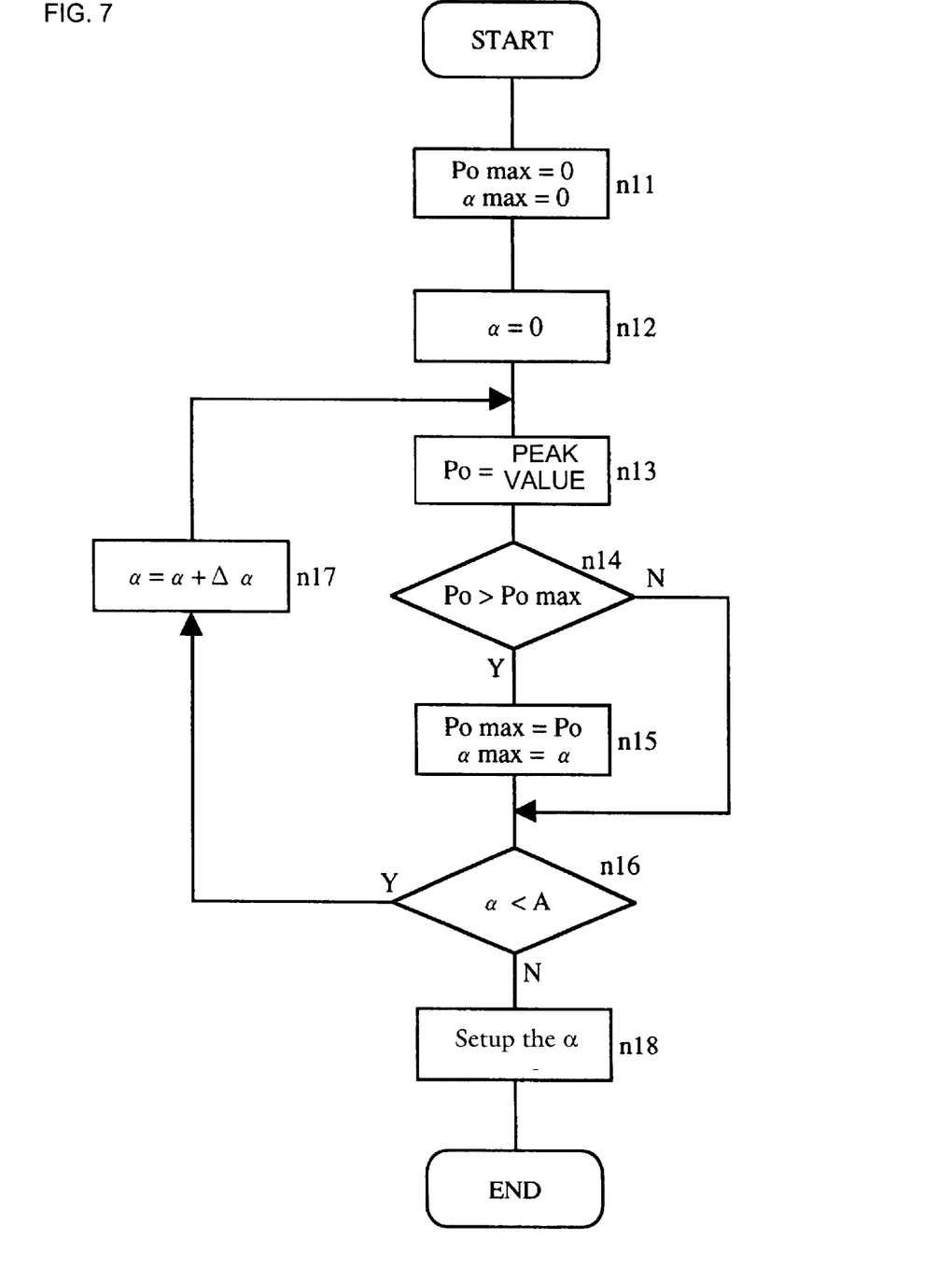
FIG. 7 is a flow-chart showing steps of the first characteristic adjustment method.

FIG. 7 is a flow-chart showing the process of the first characteristic adjustment method. First, 0 is substituted as the initial value of the variable Pomax for detecting the maximum value of the signal intensity of the peak frequency, and then, 0 is substituted as the initial value of the variable a max for obtaining the maximum value of the parameter a representing time-varying characteristics of the voltage signal for frequency-modulation (n11).

Next, the initial value 0 is substituted in the parameter $\alpha$, and the peak value at that time is to be Po (n12→n13). Then, the values Po and Pomax are compared (n14). If the peak value Po detected this time is larger than the maximum value Pomax obtained before, the peak value Po at this time is stored as Pomax. Simultaneously, the parameter $\alpha$ at this time is stored as $\alpha$max (n15).

If the parameter $\alpha$ is less than a predetermined maximum value A, the parameter a is increased by a micro-variable $\Delta\alpha$ of $\alpha$ (n16→n17).

In such a manner, while the parameter a is increased to A by $\Delta\alpha$ at a time, the value $\alpha$ is obtained as $\alpha$max when the peak value Po becomes a maximum (n16→n18).

Using the parameter a obtained as above, the table in the look-up table 11 shown in FIG. 1 is updated. Specifically, table data, in which t of the above-mentioned formula (1) is an input value and v thereof is an output value, is produced so as to renew contents of the look-up table 11. In addition, as the look-up table 11 is configured by rewritable non-volatile memory, table data is written once, and table contents are preserved even when power supply is cut off.

Figure 8A:
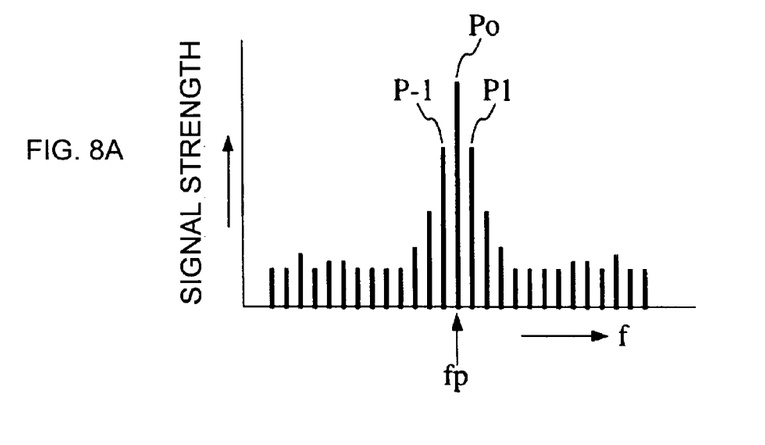
FIGS. 8A to 8C are drawings showing a frequency spectrum in a second characteristic adjustment method.
Figure 8B:
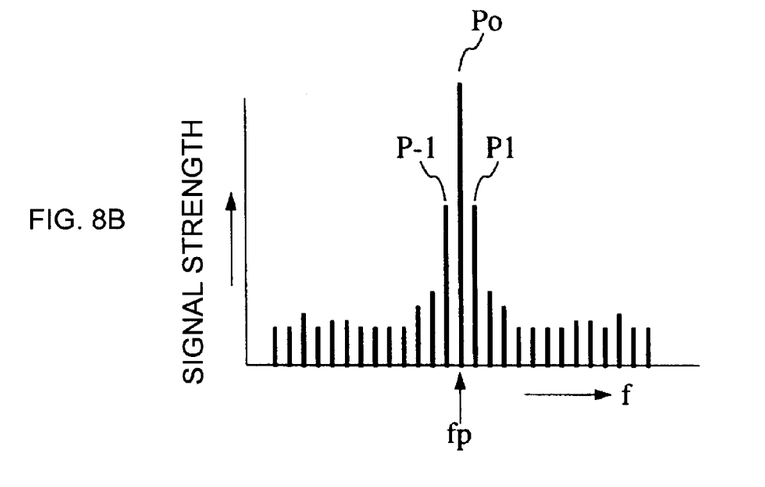
Figure 8C:
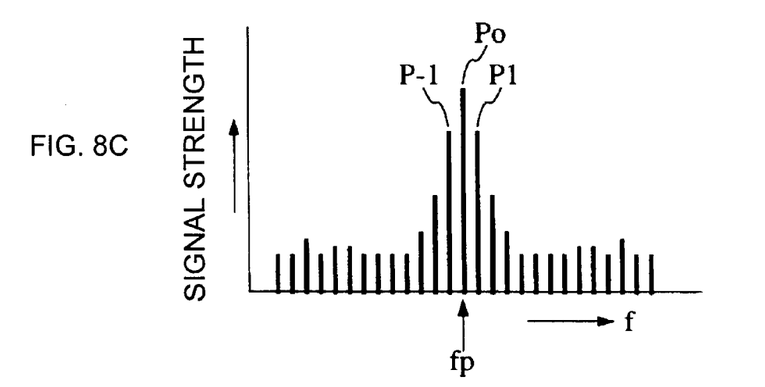

FIGS. 8A to 8C and FIG. 9 are drawings showing a second characteristic adjustment method. The frequency spectrum shown in FIGS. 8A to 8C is the same as that shown in FIGS. 6A to 6C. Different from the method shown in FIG. 7, the second characteristic adjustment method does not deal with only the signal intensity Po in the peak frequency, but also obtains an analysis value representing acuteness of a projection of signal intensity generated in a frequency spectrum by using the peak value Po of a peak frequency fp, signal intensity P-1 below by one range of the FFT range bin, and also the signal intensity P1 above by one range of the FFT range bin.

Figure 9:
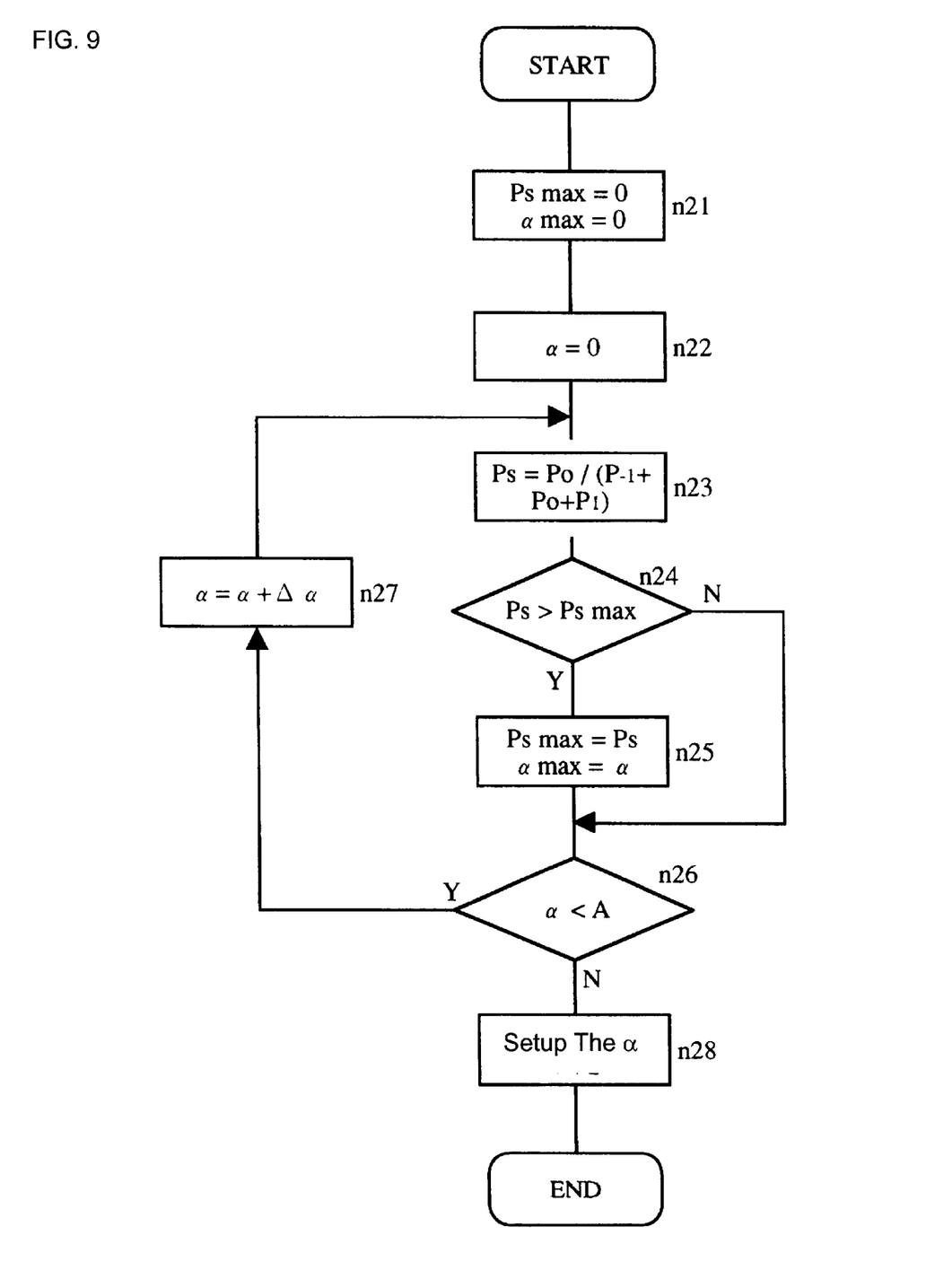
FIG. 9 is a flow-chart showing steps of the second characteristic adjustment method.

As shown in FIG. 9, as an analysis value Ps=Po/(P-1+Po+P1) is used. The analysis value Ps represents acuteness of the central protrusion of signal intensity about three range bins around the peak frequency as the center. Therefore, a parameter a is obtained when the analysis value Ps becomes a maximum. Other steps are the same as those shown in FIG. 7.

Accordingly, in the example shown in FIGS. 8A to 8C, as shown in FIG. 8B, the parameter a can be obtained, in which the protrusion of signal intensity generated in the frequency spectrum becomes most acute in shape.

FIGS. 10A to 10C and FIG. 11 are drawings showing a third characteristic adjustment method. In this method, as shown in FIG. 5B, the adjustment is performed in the state that two characteristic adjustment targets 20a and 20b are arranged at different distances.

Figure 10A:
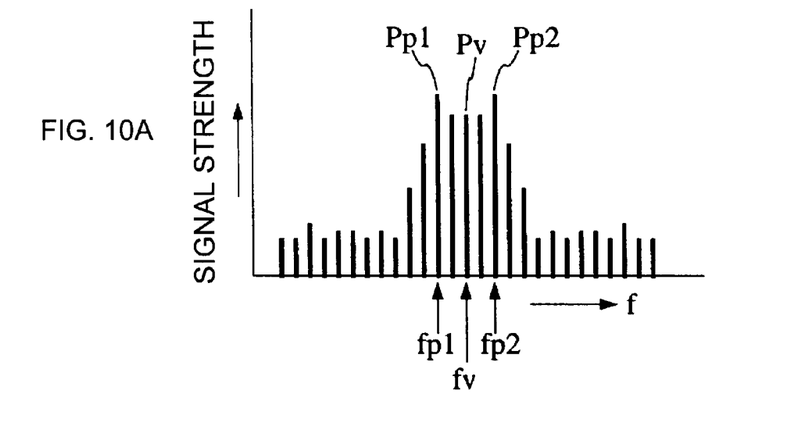
FIGS. 10A to 10C are drawings showing a frequency spectrum in a third characteristic adjustment method.
Figure 10B:
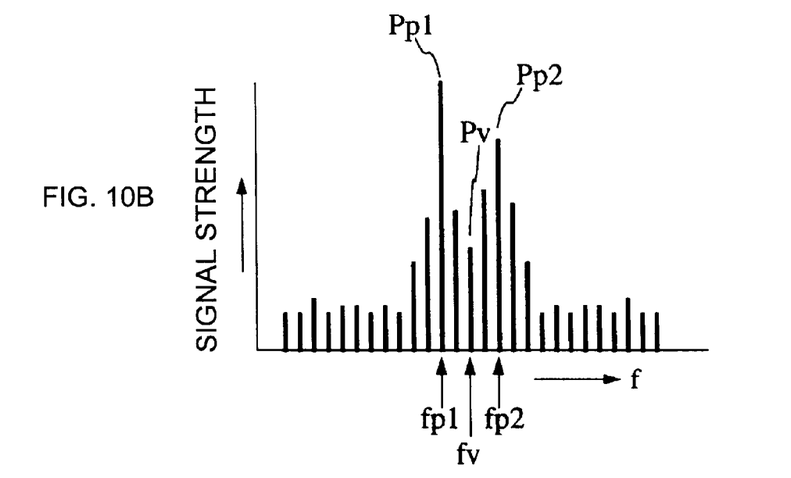
Figure 10C:
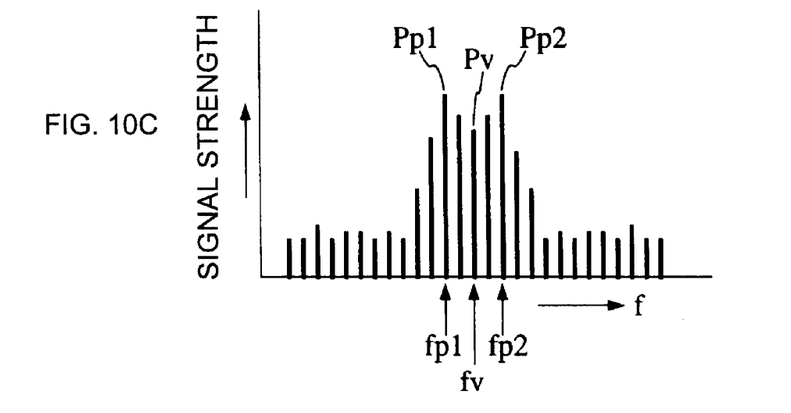

In FIGS. 10A to 10C, peak frequencies fp1 and fp2 are generated by reflection signals from the above-mentioned two targets. Signal intensities Pp1 and Pp2 are the intensities at the frequencies fp1 and fp2, respectively. A signal intensity Pv is the intensity at an intermediate frequency fv between the peak frequencies fp1 and fp2.

In this example, the value Ps is expressed by Ps=(Pp1−Pv)+(Pp2−Pv), which is the analysis value representing the signal intensities Pp1, Pv, and Pp2.

Figure 11:
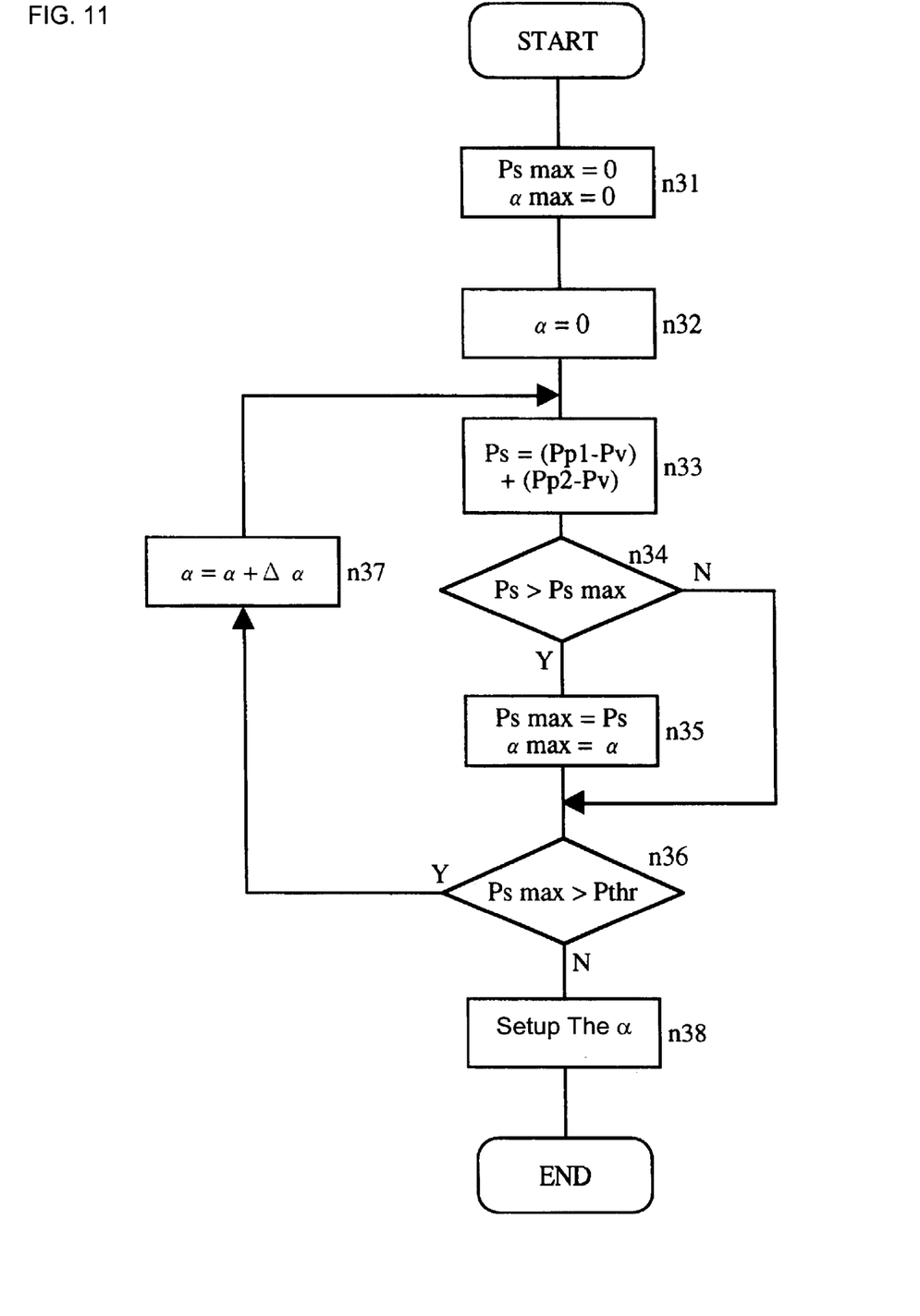
FIG. 11 is a flow-chart showing steps of the third characteristic adjustment method.

In FIG. 11, at step n33, if positions of two adjustment targets are known and the peak frequencies fp1 and fp2 can be calculated based on the target positions, the signal intensities Pp1 and Pp2 at the two peak frequencies are obtained as the signal intensities Pp1 and Pp2 at those frequencies. In this case, a frequency of (fp1+fp2)/2, or a frequency closest to it, is set as fv.

If positions of the characteristic adjustment targets are not known, positions of two protrusions of signal intensity generated in the frequency spectrum are detected to obtain signal intensities as Pp1 and Pp2. For example, by sequentially sorting signal intensities in order from the highest, a maximum and second maximum values are extracted. Also, a median of the peak frequencies fp1 and fp2 is obtained as fv. Also, in between extracted two peak frequencies, a lowest value of signal intensity is obtained as Pv.

At step n36, if Psmax exceeds a threshold value Pthr, Psmax is assumed to have two peaks in that state, so that αmax at that time is determined as the optimum value of the parameter α (n38).

In the example shown in FIG. 11, Psmax exits from a loop at the time when it exceeds the threshold value Pthr. Alternatively, as shown FIG. 7 or 9, Psmax may exit from the loop at the time when a reaches a maximum value A in a predetermined adjustment range.

In the manner described above, after adjusting the time-varying characteristics of the voltage signal for frequency-modulation for each radar system, a target can be precisely detected in a normal mode.

Although the present invention has been described in relation to particular embodiments thereof, may other variations, modifications and other uses will become apparent to those skilled in the art. Accordingly, it is preferred that the present invention not be limited by the specific disclosure herein, but only by the appended claims.

What is claimed is:

1. A radar system comprising:
   a voltage controlled oscillator which determines a sending frequency of a sending signal;
   a transmitter which sends the sending signal, the sending signal including an ascending modulation interval having a gradually increasing frequency and a descending modulation interval having a gradually decreasing frequency;
   a receiver which receives a reflected signal from a target; and
   a frequency analyzer which produces data relating to a frequency spectrum of a beat signal, the beat signal corresponding to a frequency difference between the sending signal and the reflected signal;
   wherein the radar system detects one of a relative distance and a relative speed of the target on the basis of the beat signal in the ascending modulation interval and the beat signal in the descending modulation interval.

2. The radar system according to claim 1, wherein the ascending modulation interval and the descending modulation interval are alternately repeated with time in a triangular waveform by applying a voltage signal for frequency modulation to the voltage controlled oscillator.

3. The radar system according to claim 2, further comprising:
   an adjuster for adjusting time-varying characteristics of the voltage signal for frequency modulation; and
   a data output device for outputting the data relating to the frequency spectrum.

4. The radar system according to claim 3, wherein the time-varying characteristics of the voltage signal for frequency modulation are expressed as a multinomial expression.

5. The radar system according to claim 3, wherein the time-varying characteristics of the voltage signal for frequency modulation are adjusted by changing factors of each term of the multinomial expression.

6. The radar system according to claim 1, wherein the frequency analyzer obtains a peak value of signal intensity in the frequency spectrum as the data relating to the frequency spectrum.

7. The radar system according to claim 1, wherein the frequency analyzer obtains acuteness of a peak signal intensity in the frequency spectrum as the data relating to the frequency spectrum.

8. The radar system according to claim 1, wherein the frequency analyzer obtains a plurality of differences of signal intensity in the frequency spectrum as the data relating to the frequency spectrum, each of the differences of signal intensity being a difference between a height of a peak signal intensity and a bottom adjacent to the peak signal intensity.

9. An adjusting method for adjusting characteristics of a radar system, the method comprising:
   determining a sending frequency of a sending signal, the sending signal including an ascending modulation interval having a gradually increasing frequency and a descending modulation interval having a gradually decreasing frequency;
   transmitting the sending signal towards a target;
   receiving a reflected signal from the target;
   producing data relating to a frequency spectrum of a beat signal, the beat signal corresponding to a frequency difference between the sending signal and the reflected signal;
   detecting one of a relative distance and a relative speed of the target on the basis of the beat signal in the ascending modulation interval and the beat signal in the descending modulation interval;
   applying a voltage signal for frequency modulation to the sending signal such that the ascending modulation interval and the descending modulation interval are alternately repeated with time in a triangular waveform; and
   adjusting time-varying characteristics of the voltage signal for frequency modulation.

10. The adjusting method according to claim 9, wherein a peak value of signal intensity in the frequency spectrum is the data relating to the frequency spectrum.

11. The adjusting method according to claim 9, wherein acuteness of a peak signal intensity in the frequency spectrum is the data relating to the frequency spectrum.

12. The adjusting method according to claim 9, wherein a plurality of differences of signal intensity in the frequency spectrum is the data relating to the frequency spectrum, each of the differences of signal intensity being a difference between a height of a peak signal intensity and a bottom adjacent to the peak signal intensity.

13. The adjusting method according to claim 9, wherein the time-varying characteristics of the voltage signal for frequency modulation are expressed as a multinomial expression.

14. The adjusting method according to claim 13, wherein the time-varying characteristics of the voltage signal for frequency modulation are adjusted by changing factors of each term of the multinomial expression.

* * * * *